US009415558B2

(12) United States Patent
Na et al.

(10) Patent No.: US 9,415,558 B2
(45) Date of Patent: Aug. 16, 2016

(54) METHOD AND APPARATUS FOR PREPARING COSMETICS BY IMPREGNATING CONTENTS INTO IMPREGNATING MATERIAL

(71) Applicant: AMOREPACIFIC Corporation, Seoul (KR)

(72) Inventors: Dalsu Na, Seoul (KR); Ohsoo Lee, Seoul (KR); Inchul Lee, Seoul (KR)

(73) Assignee: AMOREPACIFIC CORPORATION, Seoul (KR)

( * ) Notice: Subject to any disclaimer, the term of this patent is extended or adjusted under 35 U.S.C. 154(b) by 20 days.

(21) Appl. No.: 14/676,196

(22) Filed: Apr. 1, 2015

(65) Prior Publication Data

US 2015/0224694 A1 Aug. 13, 2015

Related U.S. Application Data

(63) Continuation-in-part of application No. 14/238,252, filed as application No. PCT/KR2012/006047 on Jul. 30, 2012.

(30) Foreign Application Priority Data

Aug. 12, 2011 (KR) ........................ 10 2011 0080746
Feb. 3, 2015 (KR) ........................ 10 2015 0016450

(51) Int. Cl.

*B29C 43/02* (2006.01)
*B30B 11/14* (2006.01)
*B30B 11/02* (2006.01)
*B30B 11/34* (2006.01)
*B30B 15/30* (2006.01)
*B30B 15/32* (2006.01)

(52) U.S. Cl.

CPC ............... *B30B 11/14* (2013.01); *B30B 11/027* (2013.01); *B30B 11/34* (2013.01); *B30B 15/302* (2013.01); *B30B 15/32* (2013.01)

(58) Field of Classification Search

CPC .... B29C 43/02; B29C 43/006; B29C 37/001; G01N 33/57415; G01N 33/57496; G01N 2440/14; G01N 2800/56
USPC ............. 264/109, 123; 425/78, 352, 410–412
See application file for complete search history.

(56) References Cited

U.S. PATENT DOCUMENTS 4,884,601 A * 12/1989 Hatakeyama ......... B30B 15/302 425/410
4,962,627 A * 10/1990 Gueret ...................... B65B 1/24 53/412
5,406,990 A * 4/1995 Haeberli ................ B65B 63/02 141/101

(Continued)

*Primary Examiner* — Joseph S Del Sole
*Assistant Examiner* — Thukhanh T Nguyen

(57) ABSTRACT

Disclosed are a method and an apparatus for preparing cosmetics by impregnating contents into an impregnating material. The apparatus includes a transfer table (110) to transfer a cosmetic vessel (200), an impregnating material supply unit (130) to introduce an impregnating material (210) into a receiving space of the cosmetic vessel (200), a content injecting unit (140) to inject the contents while moving back after pressing the impregnating material (210) introduced into the receiving space of the cosmetic vessel (200), a frame member supply unit (150) to supply a frame member (220) for fixing the impregnating material (210) impregnated with the contents, and an impregnating material fixing unit (160) to mount the frame member (220) at a mouth of the cosmetic vessel (200) in a state that the frame member (220) presses and fixes a circumference of the impregnating material (210).

7 Claims, 7 Drawing Sheets

(56) References Cited

U.S. PATENT DOCUMENTS 5,449,481 A * 9/1995 Sagawa .................. B30B 11/02
425/352
6,048,419 A * 4/2000 Guerin ..................... B30B 9/30
264/3.1
6,358,448 B1 * 3/2002 Green .................. B29C 43/006
264/109
2012/0139164 A1 * 6/2012 Ishikawa .............. B30B 11/022
264/442
2015/0232208 A1 * 8/2015 Kim ....................... B65B 43/52
141/20.5

* cited by examiner

METHOD AND APPARATUS FOR PREPARING COSMETICS BY IMPREGNATING CONTENTS INTO IMPREGNATING MATERIAL

CROSS-REFERENCE TO RELATED APPLICATION

This application is a continuation-in-part of U.S. application Ser. No. 14/238,252 filed Feb. 11, 2014, incorporated herein by reference.

BACKGROUND OF THE DISCLOSURE

1. Field of the Disclosure

The disclosure relates to a method and an apparatus for preparing cosmetics by impregnating contents into an impregnating material, and more particularly to a method and an apparatus for preparing cosmetics by impregnating contents into an impregnating material, in which a process of impregnating contents having higher viscosity into the impregnating material is applied to all products at the same degree every time and completely automated, so that an absorption degree of the contents into the impregnating material of the prepared cosmetics can be constantly maintained within a predetermined error range.

2. Description of the Related Art

In general, the types of cosmetics used in makeup include a makeup base, powder, a two-way cake, a powder pact, and a skin cover. A user selects and uses a proper type of cosmetics according to the preference, a skin characteristic, and a makeup type of the user.

In this case, most cosmetics for the makeup are prepared by pressing powder source materials containing oil ingredients after the powder source materials have been introduced into a vessel. Most cosmetics are pressed in a solid form for the production thereof. Hereinafter, a method for preparing the makeup cosmetics, for example powder will be described. A conveyance fixture having a cosmetic vessel mounted thereon is sequentially transferred by a transfer unit including a conveyer belt. In addition, during the transferring of the conveyance fixture, processes of introducing the source material containing an oil ingredient into the cosmetic vessel, pressing the source material introduced into the cosmetic vessel by a press, discharging oil from the source material in the cosmetic vessel are sequentially performed. In addition, the cosmetic vessel containing the source material having no oil ingredient is extracted.

Meanwhile, recently, a product, which is generally called “sunblock’ and mainly performs an ultraviolet (UV) protection function, has been supplied. The sunblock cosmetics may include a makeup base or products having other makeup functions. The sunblock product has high preference in that a user not only can reduce make-up time, but also can express light summer makeup because the sunblock product simultaneously provides both of a UV protection function and a foundation makeup function.

The cosmetics having the UV protection function are prepared by mainly using contents having viscosity. The contents having viscosity have been used in such a manner that the contents are filled in a glass vessel or a tube and a user may put the contents on a hand of the user or squeeze the tube to apply the contents onto a skin with a puff or the hand of the user.

However, the contents having the viscosity are inconvenient in use since the hand of the user is stained with a cosmetic material whenever the user uses the contents so that the user must wash the hand of the user. In addition, as the user washes the hand stained with the cosmetic material, the cosmetic material may be wasted.

In order to solve the above problem, applicant of the subject application has filed an application and the application has been registered as Korean Patent Registration No. 10-1257628. According to the related art, a cosmetic material having viscosity is impregnated into a porous impregnating material, thereby allowing a user to put the cosmetic material on a puff and to apply the cosmetic material on a skin of the user. Accordingly, the user can easily use the cosmetic material without staining the hand with the cosmetic material.

However, according to the related art, since a process of impregnating the contents into an impregnating material is only manually performed, even though manpower is significantly consumed in the preparation process of the cosmetics, the productivity is not high. Accordingly, when cosmetics are prepared in mass production, manpower is significantly required, which causes the increase in production costs and product prices due to labor costs.

In addition, the impregnating degree of the contents into the impregnating material may depend on the job skill of a worker or the concentration degree of the worker on the job. Accordingly, the finally prepared cosmetics have no uniform quality. In other words, when all products are manufactured, the uniformity in the quality of the finally manufactured products is very important. However, if the process of impregnating the contents into the impregnating material is performed only manually, the dispersion in the quality of the finally produced cosmetics may be increased. Accordingly, consumers may be dissatisfied with the products even through cosmetics having excellent quality are prepared, so that the reliability of the products may be degraded.

In addition, during the conveying of a cosmetic internal plate, dust or foreign matters may be introduced into the inner part of the internal plate. In the preparation process of cosmetics according to the related art, since internal plates must be individually cleaned manually, this process of cleaning the internal plates is frequently omitted, so that contents are introduced onto the internal plate having the dust and the foreign matters. Therefore, the quality of the finally prepared cosmetics may be degraded and the cosmetics may be contaminated with contaminants contained in the foreign matters.

In order to solve the above problem, applicant of the subject application has filed an application and the application has been registered as Korean Patent Registration No. 10-1246554. According to the related art, after contents are introduced into the receiving space of a cosmetic vessel, an absorber is introduced into the receiving space having the contents. Thereafter, the absorber is repeatedly pressed to absorb the contents into the absorber.

However, according to the related art, after the contents are introduced into the receiving space of the cosmetic vessel, the absorber is introduced into the receiving space of the cosmetic vessel, and repeatedly pressed. Accordingly, when the absorber is pressed, contents, which are not absorbed into the absorber, are overflowed between the cosmetic vessel and the absorber, so that the cosmetic vessel may be contaminated, and the contents may be wasted.

SUMMARY OF THE DISCLOSURE

Accordingly, the disclosure is suggested in order to the problem occurring in the related art, and an object of the disclosure is to provide a method and an apparatus for preparing cosmetics by impregnating contents into an impregnating material, in which a preparation process of impregnating contents having higher viscosity into the impregnating material is applied to all products at the same degree every time and completely automated, so that an absorption degree of the contents into the impregnating material of the prepared cosmetics can be constantly maintained within a predetermined error range.

Another object of the disclosure is to provide a method and an apparatus for preparing cosmetics by impregnating contents into an impregnating material, capable of impregnating a required amount of contents into the impregnating material by preventing the contents from being overflowed between a cosmetic vessel and the impregnating material when impregnating the contents into the impregnating material by injecting the contents while the impregnating material is pressed by a content injecting unit and moved back after the impregnating material is put into a receiving space of the cosmetic vessel.

Still another object of the disclosure is to provide a method and an apparatus for preparing cosmetics by impregnating contents into an impregnating material, in which a process of sucking a foreign matters from a cosmetic internal plate moved to introduce contents and the impregnating material is previously performed through automation before the contents and the impregnating contents are introduced into the cosmetic internal plate, so that the finally manufactured product can be basically protected from containing foreign matters or from being contaminated with the foreign matters, thereby continuously maintaining excellent quality, and relevant functions can be performed through an unmanned process without wasting manpower.

In order to accomplish the objects, according to one aspect of the disclosure, there is provided an apparatus for preparing cosmetics by impregnating contents into an impregnating material. The apparatus includes a transfer table to transfer a cosmetic vessel, a foreign matter suction unit to suck a foreign matter from a receiving space of the cosmetic vessel, an impregnating material supply unit to introduce an impregnating material into the receiving space of the cosmetic vessel, a content injecting unit to inject the contents while moving back after pressing the impregnating material introduced into the receiving space of the cosmetic vessel, a frame member supply unit to supply a frame member for fixing the impregnating material impregnated with the contents, and an impregnating material fixing unit to mount the frame member at a mouth of the cosmetic vessel in a state that the frame member presses and fixes a circumference of the impregnating material.

In addition, the foreign matter suction unit, the impregnating material supply unit, the content injecting unit, the frame member supply unit, and the impregnating material fixing unit are sequentially installed on the transfer table in a direction of transferring to the cosmetic vessel.

In addition, the content injecting unit includes a press body fixed to the transfer table, an actuator mounted in the press body and including a vertically movable actuating unit, a pressing unit coupled to a lower end of the vertically movable unit and inserted into the receiving space of the cosmetic vessel when the vertically movable unit moves down to press the impregnating material, and a nozzle coupled to one side of the pressing unit to introduce the contents when the pressing unit moves up.

In addition, the pressing unit includes an inlet to receive the contents from the nozzle, a movement space to move the contents received through the inlet, and a plurality of injection ports to inject the contents to an upper portion of the impregnating material.

Further, the apparatus further includes a cosmetic vessel output unit to supply the cosmetic vessel having the impregnating material fixed in the receiving space of the cosmetic vessel to a transfer line of another process through the foreign matter suction unit, the impregnating material supply unit, the content injecting unit, the frame member supply unit, and the impregnating material fixing unit.

According to one aspect of the disclosure, there is provided a method for preparing cosmetics by impregnating contents into an impregnating material. The method includes sucking a foreign matter from an inner part of a cosmetic vessel after the cosmetic vessel transferred along a transfer table is stopped under a foreign matter suction unit, supplying an impregnating material to the cosmetic vessel as the cosmetic vessel, from which the foreign matter is sucked, is stopped under an impregnating material supply unit, injecting contents by moving back a content injecting unit after the content injecting unit presses the impregnating material as the cosmetic vessel having the impregnating material supplied therein is stopped under a content injecting unit, supplying a frame member to a mouth of the cosmetic vessel as the impregnating material having the injected contents is stopped under the frame member supply unit, and fixing the impregnating material into a receiving space of the cosmetic vessel by pressing the frame member as the cosmetic vessel having the supplied frame member is stopped under the impregnating material fixing unit.

As described above, according to the disclosure, as the preparation process of impregnating contents into the impregnating material is applied to all products at the same degree every time and completely automated, the absorption degree of the contents into the impregnating material of the prepared cosmetics can be constantly maintained within the predetermined error range.

In addition, a required amount of contents can be impregnated into the impregnating material by preventing the contents from being overflowed between a cosmetic vessel and the impregnating material when impregnating the contents into the impregnating material by injecting the contents while the impregnating material is pressed by a content injecting unit and moved back after the impregnating material is put into a receiving space of the cosmetic vessel.

In addition, the process of sucking the foreign matters from the cosmetic internal plate moving to introduce the contents and the impregnating material is previously performed through automation before the contents and the impregnating contents are introduced into the cosmetic internal plate, so that the finally manufactured product can be basically protected from containing foreign matters or from being contaminated with the foreign matters, thereby continuously maintaining excellent quality, and the relevant functions can be performed through an unmanned process without wasting manpower.

DETAILED DESCRIPTION OF THE DISCLOSURE

Figure 1:
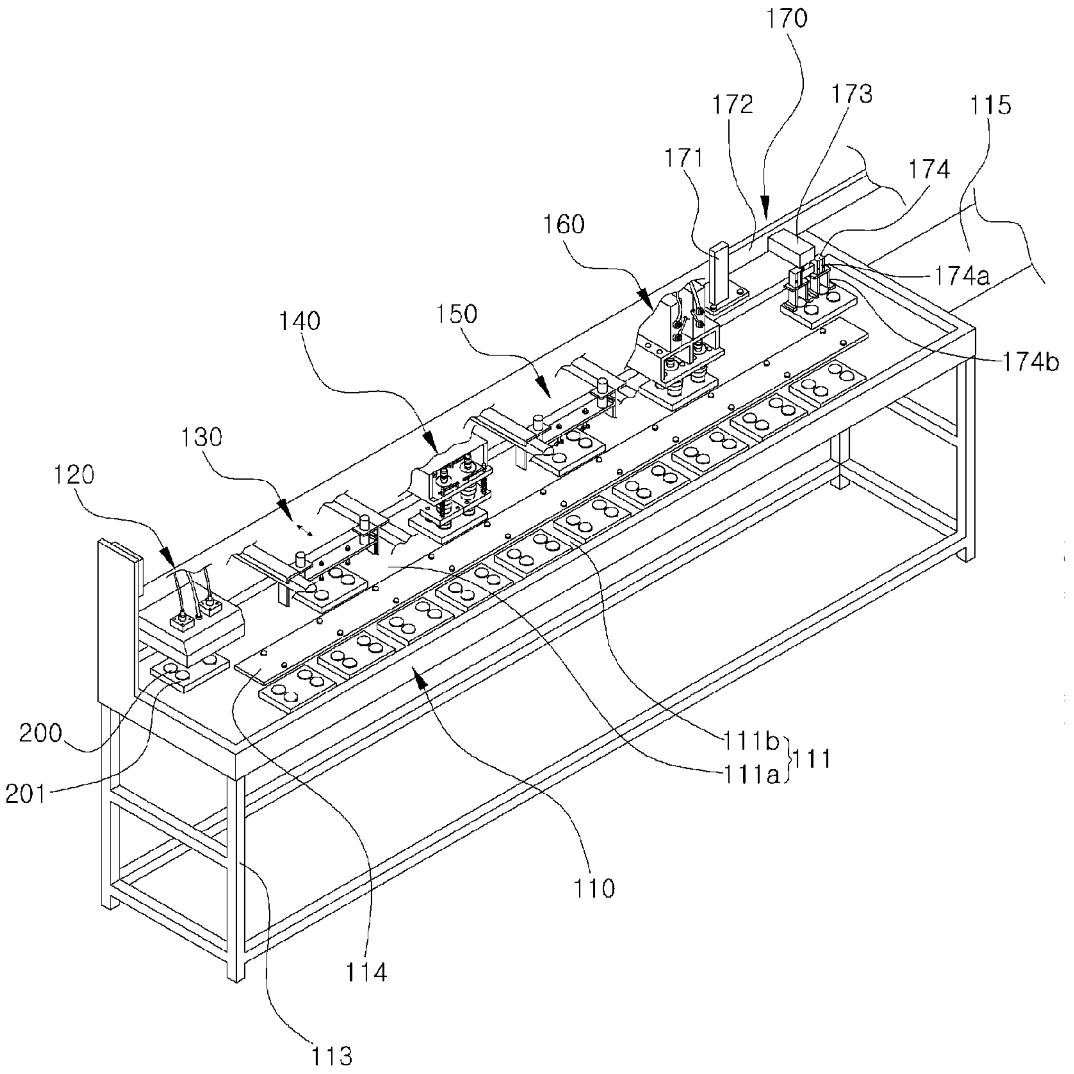
FIG. 1 is a perspective view showing an apparatus for preparing the cosmetics by impregnating contents into an impregnating material according to one embodiment of the disclosure.

Hereinafter, an apparatus for preparing cosmetics by impregnating contents into an impregnating material according to one embodiment of the disclosure will be described with accompanying drawings.

An apparatus 100 (cosmetic preparing apparatus) for preparing cosmetics by impregnating contents into an impregnating material according to the disclosure includes a transfer table 110 to transfer a cosmetic vessel 200, a foreign matter suction unit 120 to suck a foreign matter from a receiving space of the cosmetic vessel 200, an impregnating material supply unit 130 to introduce an impregnating material 210 into the receiving space of the cosmetic vessel 200, a content injecting unit 140 to inject the contents while moving back after pressing the impregnating material 210 introduced into the receiving space of the cosmetic vessel 200, a frame member supply unit 150 to supply a frame member 220 for fixing the impregnating material 210 impregnated with the contents, and an impregnating material fixing unit 160 to mount the frame member 220 at a mouth of the cosmetic vessel 200 in a state that the frame member 220 presses and fixes a circumference of the impregnating material 210.

FIG. 1 is a perspective view showing the cosmetic preparing apparatus 100 according to one embodiment of the disclosure.

As shown in the drawing, the cosmetic preparing apparatus 100 according to one embodiment of the disclosure includes the transfer table 110, the foreign matter suction unit 120, the impregnating material supply unit 130, the content injecting unit 140, the frame member supply unit 150, and the impregnating material fixing unit 160. The cosmetic preparing apparatus 100 according to one embodiment of the disclosure may further include a cosmetic vessel output unit 170 to supply the cosmetic vessel 200 to a transfer line 115 associated with another process.

The transfer table 110 sequentially transfers the cosmetic vessel 200 to the foreign matter suction unit 120, the impregnating material supply unit 130, the content injecting unit 140, the frame member supply unit 150, and the impregnating material fixing unit 160. To this end, the transfer table 110 is provided on a top surface thereof with a conveyer belt 111. Additionally, according to the present embodiment, the transfer table 110 includes a leg part 113 so that the transfer table 110 is spaced apart from the floor of a working place by a predetermined distance.

In detail, the transfer table 110 is provided on the top surface thereof with the conveyer belt 111, and a central separation bar 114 is mounted in a longitudinal direction of the transfer table 110 according to the present embodiment. First and second conveyer belts 111*a* and 111*b* are mounted at both sides of the central separation bar 114 to operate in opposite directions to each other. Referring to FIG. 1, the first conveyer belt 111*a* sequentially moves the cosmetic vessel 200 from the foreign matter suction unit 120 to be described below toward the impregnating material fixing unit 160.

In addition, the second conveyer belt 111*b* operates in the direction opposite to that of the first conveyer belt 111*a* to supply the cosmetic vessel 200 to the first conveyer belt 111*a*. In addition, the cosmetic vessel 200 is transferred in the state that the cosmetic vessel 200 is mounted on a moving block 201.

The foreign matter suction unit 120 sucks foreign matters such as dust existing in the receiving space of the cosmetic vessel 200 to clear the receiving space of the cosmetic vessel 200 before the impregnating material is supplied to the cosmetic vessel 200.

Although the foreign matter suction unit 120 is fixedly mounted on the transfer table 110 according to the present embodiment for the illustrative purpose, the disclosure is not limited thereto. The foreign matter suction unit 120 may include various types of suction units mounted at various locations only if the foreign matter suction unit 120 applies suction force to the receiving space of the cosmetic vessel 200.

Figure 2:
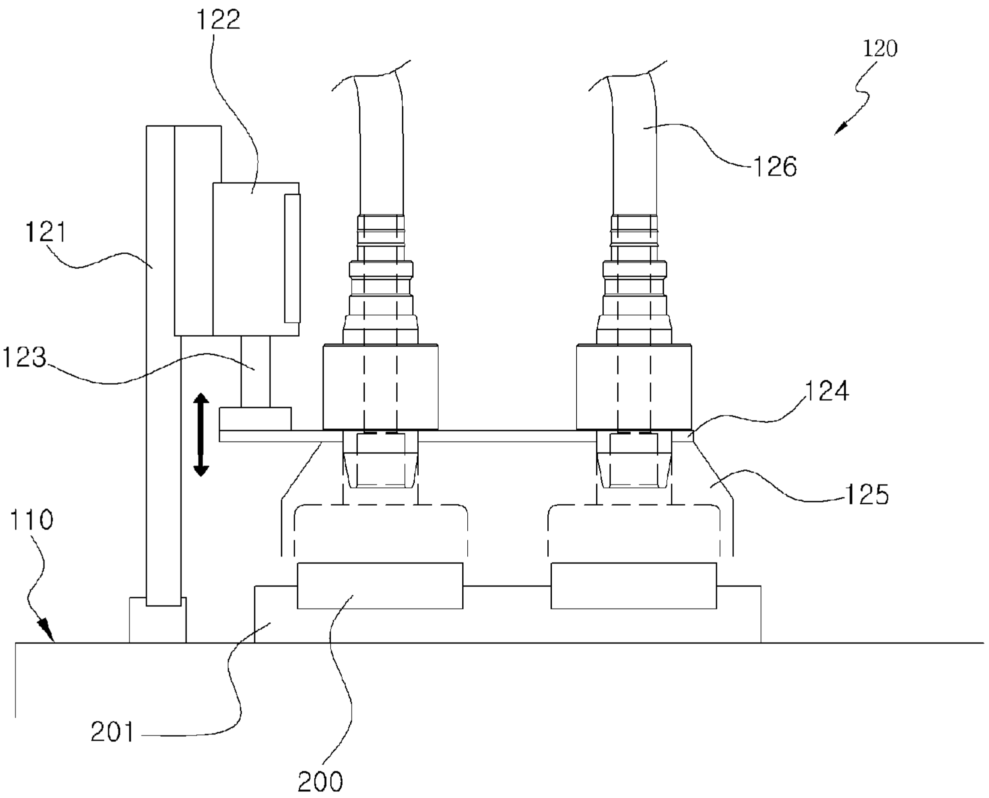
FIG. 2 is a view showing the structure and the operating state of a foreign matter suction unit provided in the apparatus for preparing the cosmetics by impregnating the contents into the impregnating material according to one embodiment of the disclosure.

FIG. 2 is a view showing the structure and the operating state of the cosmetic preparing apparatus 100 according to the disclosure. Hereinafter, the foreign matter suction unit 120 will be described in more detail with reference to FIG. 2. The foreign matter suction unit 120 includes a support post 121, an actuator 122, a vertically moving unit 124, a suction cover 125, a hydraulic pump (not shown), and a hydraulic hose 126.

The support post 121 is mounted in an upright state on the transfer table 110, and the actuator 122 is mounted at an upper portion of the support post 121. The actuator 122 may include a hydraulic cylinder or a pneumatic cylinder. The vertically moving unit 124 is coupled to a lower end of a cylinder rod 123 of the actuator 122.

The vertically moving unit 124 is mounted in parallel to a top surface of the transfer table 110, and the suction cover 125 is coupled to a lower portion of the vertically moving unit 124 to move together with the vertical operation of the vertically moving unit 124. In other words, when the cosmetic vessel 200 is transferred to the foreign matter suction unit 120, the suction cover 125 is moved down to be located on the cosmetic vessel 200 and to suck the foreign matters from the receiving space of the cosmetic vessel 200.

The hydraulic hose 126 is coupled to an upper portion of the suction cover 125 so that one end of the hydraulic hose 126 is coupled to the hydraulic pump (not shown) to generate suction force. In other words, the one end of the hydraulic hose 126 is coupled to the hydraulic pump (not shown), and an opposite end of the hydraulic hose 126 is coupled to the suction cover 125 while communicating with an internal space of the suction cover 125, so that the suction force is supplied to the internal space of the suction cover 125 as the hydraulic pump (not shown) operates.

Hereinafter, the impregnating material supply unit 130 will be described. The impregnating material supply unit 130 introduces the impregnating material 210 into the receiving space of the cosmetic vessel 200 from which the foreign matters are removed by the foreign matter suction unit 120.

Figure 3:
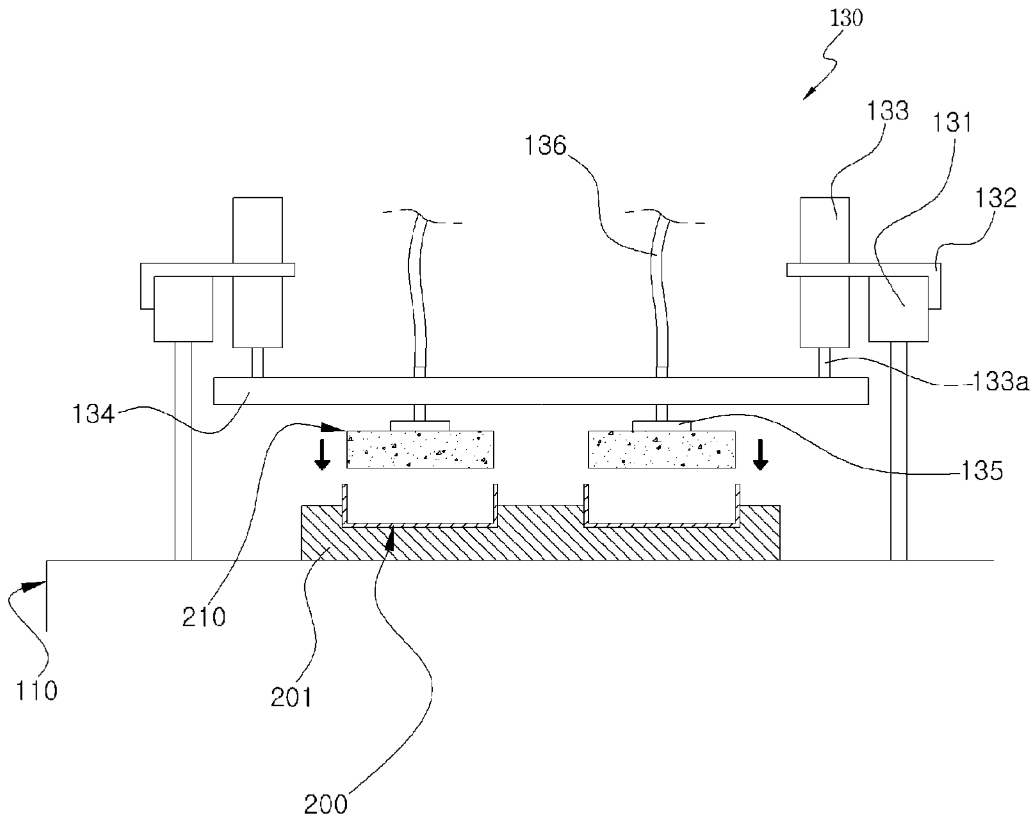
FIG. 3 is a view showing the structure and the operating state of an impregnating material supply unit provided in the apparatus for preparing the cosmetics by impregnating the contents into the impregnating material according to one embodiment of the disclosure.

FIG. 3 is a view showing the structure and the operating state of the impregnating material supply unit 130. Hereinafter, the impregnating material supply unit 130 will be described in more detail with reference to FIG. 3. The impregnating material supply unit 130 includes a pair of guide rails 131, a sliding coupling unit 132, an actuator 133, a vertically moving unit 134, an adsorption unit 135, a hydraulic pump (not shown) and a hydraulic hose 136.

On the assumption that a direction of transferring the cosmetic vessel 200 is defined as a first direction, the paired guide rails 131 are mounted in parallel to each other in a direction perpendicular to the first direction.

A pair of sliding coupling units 132 are provided and slidably coupled to the paired guide rails 131, respectively.

A pair of actuators 133 are provided and coupled to the paired sliding coupling units 132, respectively. According to the present embodiment, the actuators 133 are hydraulic cylinders, and the vertically moving unit 134 is coupled to cylinder rods 133*a* of the paired actuators 133.

In other words, the vertically moving unit 134 is mounted in parallel to the top surface of the transfer table 110. The vertically moving unit 134 reciprocates between a position closer to the transfer table 110 and a position spaced apart from the transfer table 110 according to the operation of the actuators 133 and the vertical movements of the cylinder rods 133*a* resulting from the operation of the actuators 133.

The adsorption unit 135 is mounted under the vertically moving unit 134. After the adsorption unit 135 adsorbs the impregnating material 210 spaced apart from an outside of the transfer table 110 by a predetermined distance and stored, the adsorption unit 135 moves the impregnating material 210 onto the receiving space of the cosmetic vessel 200 as the sliding coupling unit 132 and the vertically moving unit 134 moves. In this state, the adsorption unit 135 transfers the impregnating material 210 into the receiving space of the cosmetic vessel 200. Thereafter, adsorption force is removed from the adsorption unit 135, so that the impregnating material 210 is provided in the receiving space of the cosmetic vessel 200.

The hydraulic hose 136 is coupled to an upper portion of the adsorption unit 135. The hydraulic hose 136 has one end coupled to the hydraulic pump (not shown) and an opposite end coupled to the adsorption unit 135 to generate suction force so that the adsorption unit 135 can adsorb the impregnating material 210.

Hereinafter, the content injecting unit 140 will be described with reference to FIG. 1. The content injecting unit 140 injects cosmetic contents into the cosmetic vessel 200 having the impregnating material 210 therein.

Although the present embodiment provides contents having a complex function of at least two of a whitening function, a sun protection function, a cooling effect, and a make-up base function, having higher viscosity, and generally called "sunblock" for the illustrative purpose, the disclosure is not limed thereto.

Figure 4:
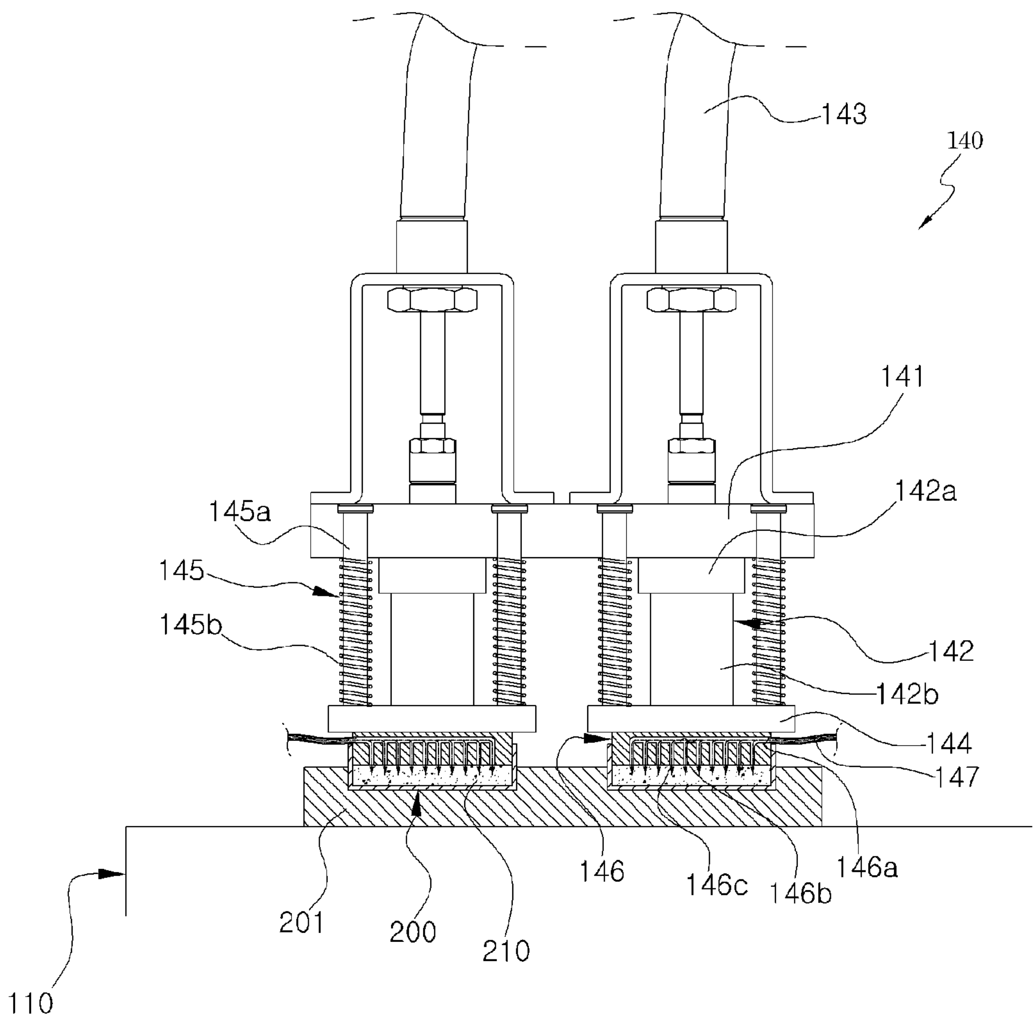
FIG. 4 is a view showing the structure and the operating state of a content injecting unit provided in the apparatus for preparing the cosmetics by impregnating the contents into the impregnating material according to one embodiment of the disclosure.

FIG. 4 is a view showing the structure and the operating state of the content injecting unit 140. The content injecting unit 140 will be described below in more detail with reference to FIG. 4. The content injecting unit 140 includes a press body 141, an actuator 142, a hydraulic hose 143, an elastic shaft support unit 144, an elastic shaft 145, a pressing unit 146, and a nozzle 147.

The press body 141 is mounted on the transfer table 110. The actuator 142 is mounted under the press body 141. According to the present embodiment, the actuator 142 is a hydraulic cylinder.

In other words, the actuator 142 includes a body 142*a* fixed to the press body 141 and a movable unit 142*b* coupled to the body 142*a* to move up and down. In addition, one end of the hydraulic hose 143 is coupled to an upper portion of the body 142*a*, and an opposite end of the hydraulic hose 143 is coupled to the hydraulic pump (not shown) to apply pressure resulting from the operation of the hydraulic pump (not shown) to the actuator 142.

The elastic shaft support unit 144 is coupled to the lower end of the movable unit 142*b* of the actuator 142, so that the elastic shaft support unit 144 moves up and down together with the vertical movement of the movable unit 142*b*.

The elastic shaft 145 is mounted between the press body 141 and the elastic shaft support unit 144. The elastic shaft 145 is extended when the movable unit 142*b* moves down and then recovered to an original position when the movable unit 142*b* moves up. In this case, the elastic shaft 145 provides elastic force to the movable unit 142*b* upward in the process that the elastic shaft 145 is recovered. Accordingly, when the movable unit 142 moves up, the movable unit 142 may move up at less hydraulic pressure due to the elasticity of the elastic shaft 145.

According to the present embodiment, the elastic shaft 145 includes a shaft 145*a* and an elastic member 145*b*. In other words, the shaft 145*a* has upper and lower ends coupled to the press body 141 and the elastic shaft support unit 144, respectively. The elastic member 145*b* includes a coil-type spring and is wounded around an outer portion of the shaft 145*a*.

The pressing unit 146 is coupled to the lower end of the elastic shaft support unit 144. The pressing unit 146 moves up and down by the elastic shaft support unit 144 while pressing the impregnating material 210 provided in the receiving space of the cosmetic vessel 200 or releasing the pressing of the impregnating material 210. In addition, the pressing unit 146 has one side coupled to the nozzle 147 to introduce contents when the pressing unit 146 moves up.

The pressing unit 146 includes an inlet 146*a* to introduce the contents from the nozzle 147, a movement space 146*b* to move the contents introduced through the inlet 146*a*, and a plurality of injection ports 146*c* to inject the contents to the upper portion of the impregnating material 210.

In other words, when the cosmetic vessel 200 having the impregnating material 210 therein is transferred to the content injecting unit 140, the pressing unit 146 moves down to press the impregnating material 210 to be contracted. Thereafter, the pressing unit 146 gradually moves up while introducing the contents through the nozzle 147 to inject the contents through the injection ports 146*c* of the pressing unit 146.

Accordingly, as the pressing unit 146 moves up, the shape of the impregnating material 210 contracted by the pressing unit 146 is recovered to an original shape while the impregnating material 210 sucks the contents. In this case, the contents are injected through the injection ports 146*c* so that the contents can be uniformly and rapidly injected into the impregnating material 210.

Therefore, according to the cosmetic preparing apparatus 100 of the disclosure, when the contents are impregnated into the impregnating material 210, the contents are not overflowed between the cosmetic vessel 200 and the impregnating material 210, so that a required amount of contents can be impregnated into the impregnating material 210.

The frame member supply unit 150 will be described below with reference to FIG. 1. The frame member supply unit 150 mounts the frame member 220 at the mouth of the cosmetic vessel 200. In this case, the impregnating material 210 introduced into the receiving space of the cosmetic vessel 200 has completely absorbed the contents of the cosmetics. In addition, the frame member 220 presses the circumference of the impregnating material 210 while the frame member 220 is fixed to the mouth of the cosmetic vessel 200, thereby fixing the impregnating material 210 into the cosmetic vessel 200.

Figure 5:
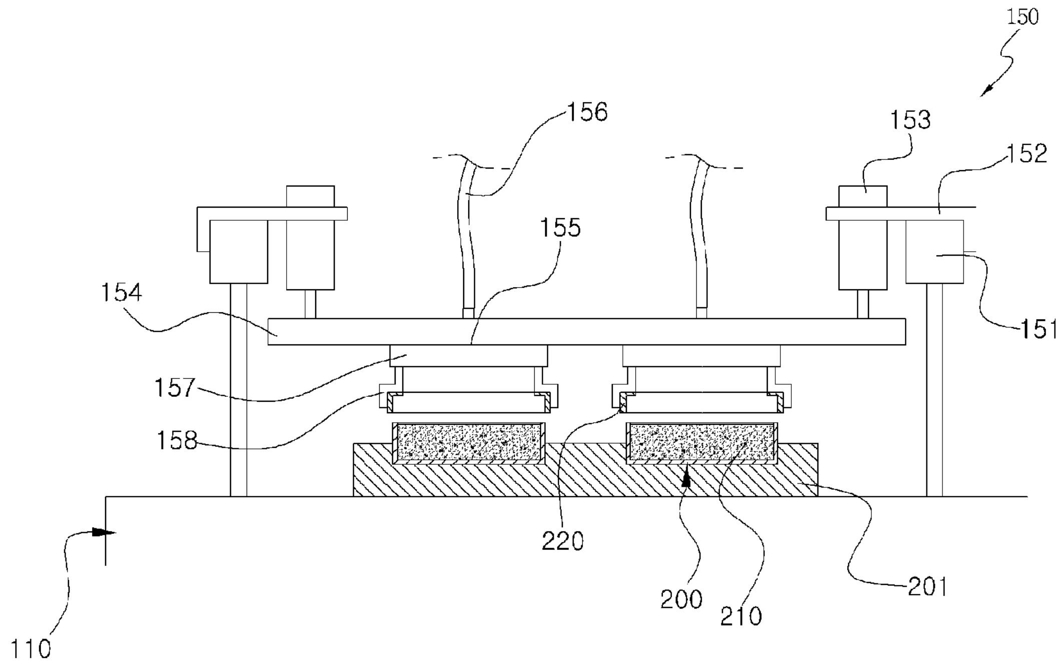
FIG. 5 is a view showing the structure and the operating state of a frame member supply unit provided in the apparatus for preparing the cosmetics by impregnating the contents into the impregnating material according to one embodiment of the disclosure.

Hereinafter, the frame member supply unit 150 will be described in more detail with reference to FIG. 5. The frame member supply unit 150 includes a pair of guide rails 151, a sliding coupling unit 152, a first actuator 153, a vertically moving unit 154, a coupling unit 155, a hydraulic hose 156, a second actuator 157, and a clamp unit 158. In other words, the whole structure of the frame member supply unit 150 is similar to that of the impregnating material supply unit 130 except that the frame member supply unit 150 further includes the coupling unit 155, the second actuator 157, and the hydraulic hose 156 and the clamping unit 158 coupled to the second actuator 157.

Therefore, in the following description of the frame member supply unit 150, the structure and the components identical to those of the impregnating material supply unit 130 can be understood by making reference to the description of the impregnating material supply unit 130, so that the details thereof will be omitted, and the following description of the frame member supply unit 150 will be made while focusing on the coupling unit 155, the second actuator 157, and the hydraulic hose 156 and the clamping unit 158 coupled to the second actuator 157.

The coupling unit 155 is coupled to a lower portion of the vertically moving unit 154, and the second actuator 157 is mounted at the lower portion the vertically moving unit 154. In addition, the hydraulic hose 156 has one end coupled to a hydraulic pump (not shown) and an opposite end coupled to the vertically moving unit 154 to apply hydraulic pressure to the second actuator 157.

The second actuator 157 is coupled to the coupling unit 155 as described above, so that both sides of the clamp unit 158 are pressed together inward or spread together outward according to the operation of the second actuator 157. Although the second actuator 157 is the hydraulic cylinder according to the present embodiment for the illustrative purpose, the disclosure is not limited thereto. In other words, the clamp unit 158 grasps the frame member 220 or releases the grasping state of the frame member 220 through the operation of the second actuator 157. In detail, referring to FIG. 5, FIG. 5 is a view showing that the clamp unit 158 grasps the frame member 220 and transfers the frame member 220 to the upper portion of the receiving space of the cosmetic vessel 200.

In other words, after the clamp unit 158 places the frame member 220 on the mouth of the cosmetic vessel 200 by grasping the frame member 220, the clamp unit 158 releases the grasping state of the frame member 220.

The impregnating material fixing unit 160 will be described below with reference to FIG. 1. The impregnating material fixing unit 160 presses the frame member 220 so that the frame member 220 is mounted on the mouth of the cosmetic vessel 200 in the state that the frame member 220 presses and fixes the circumference of the impregnating material 210.

Figure 6:
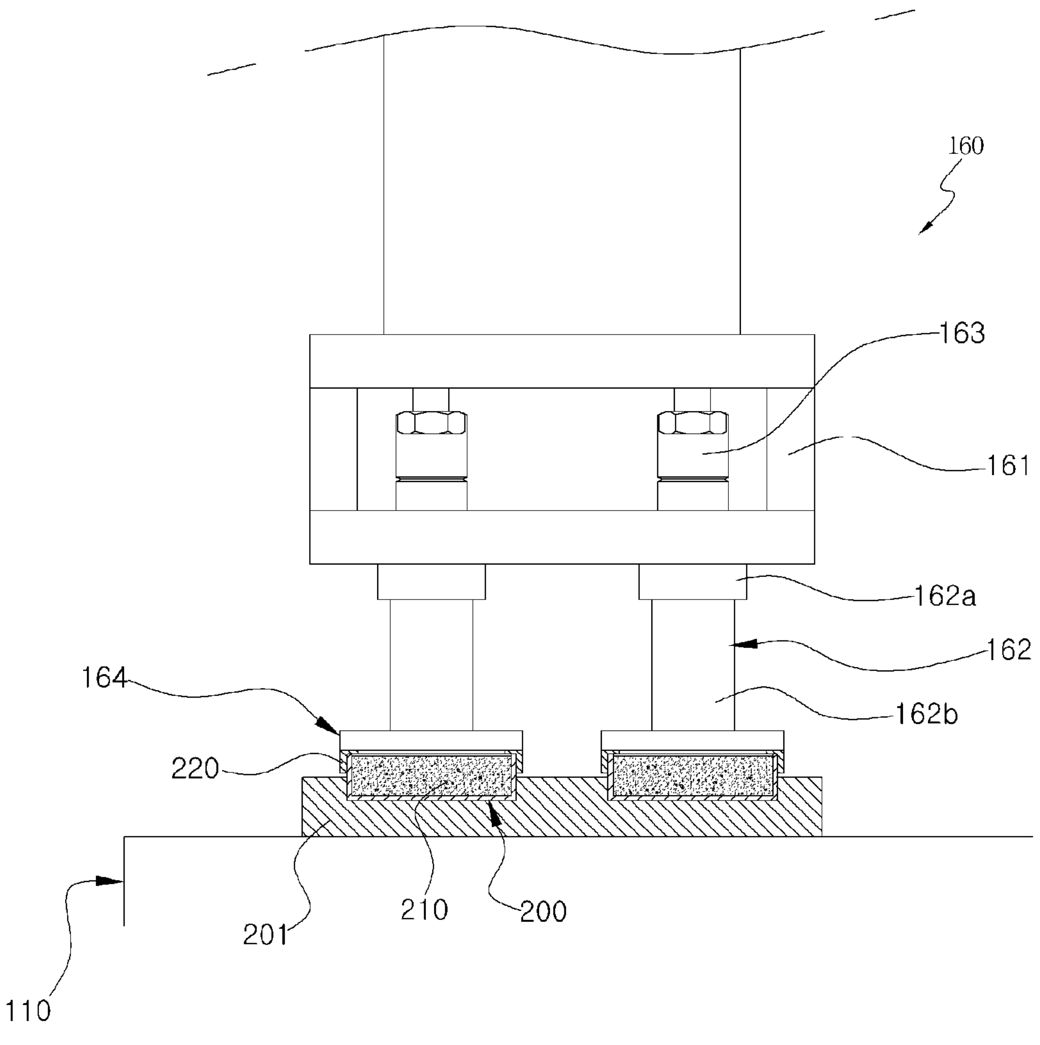
FIG. 6 is a view showing the structure and the operating state of an impregnating material fixing unit provided in the apparatus for preparing the cosmetics by impregnating the contents into the impregnating material according to one embodiment of the disclosure.

The impregnating material fixing unit 160 will be described below in more detail with reference to FIG. 6. The impregnating material fixing unit 160 includes a press body 161, an actuator 162, a hydraulic hose 163, and a pressing member 164. In other words, although the impregnating material fixing unit 160 includes a press according to the present embodiment, the disclosure is not limited thereto, but the impregnating material fixing unit 164 may include various types of impregnating material fixing units sufficient to fix the impregnating material into the receiving space of the cosmetic vessel 200 by pressing the frame member 220 at the mouth of the cosmetic vessel 200.

The press body 161 is mounted on the transfer table 110, and the actuator 162 is mounted under the press body 161. According to the present embodiment, the actuator 162 is formed in the configuration of the hydraulic cylinder. In other words, the actuator 162 includes a body **162*a* fixed to the press body 161 and a movable unit 162*b* coupled to the body 162*a* to vertically move. In addition, one end of the hydraulic hose 163 is coupled to the upper portion of the body 162*a*, and an opposite end of the hydraulic hose 163 is coupled to a hydraulic pump (not shown) so that the hydraulic hose 163 transmits pressure resulting from the operation of the hydraulic pump to the actuator 162**.

In addition, the pressing member 164 is coupled to a lower portion of the movable unit **162*b* to move together with the vertical movement of the movable unit 162*b*. The pressing member 164 actually presses the frame member 220. Accordingly, the pressing membern 164 is formed in the structure the same as or similar to that of the frame member 220**.

In other words, the pressing member 164 mounts the frame member 220 at the mouth of the cosmetic vessel 200 by pressing the frame member 220. Since the frame member 220 may be fixed to the mouth of the cosmetic vessel 200 through various technologies such as an undercut coupling scheme or a press-fitting scheme, the detailed drawings and the details thereof will be omitted according to the present embodiment.

Figure 7:
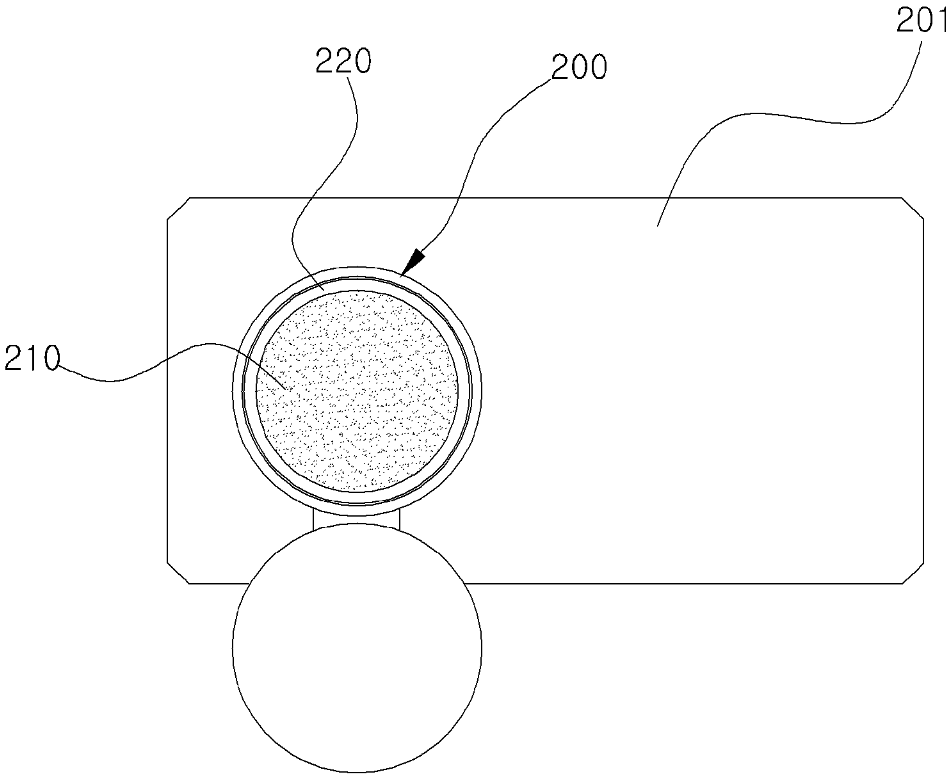
FIG. 7 is a view showing that the impregnating material and the frame member are provided in a cosmetic vessel of the apparatus for preparing the cosmetics by impregnating the contents into the impregnating material according to one embodiment of the disclosure.

As described above, when the frame member 220 is mounted at the mouth of the cosmetic vessel 200 by the pressing member 164, the impregnating material 210 impregnated with contents is fixed into the receiving space of the cosmetic vessel 200 as shown in FIG. 7.

The cosmetic vessel output unit 170 will be described below with reference to FIG. 1. The cosmetic vessel output unit 170 supplies the cosmetic vessel 200, which is subject to a series processes ranging from a process for the foreign matter suction unit 120 to a process for the impregnating material fixing unit 160, to the transfer line 115 associated with another process.

In other words, the cosmetic vessel 200, which has the impregnating material 210 fixed in the receiving space of the cosmetic vessel 200, is transferred to the transfer line 115 by the cosmetic vessel output unit 170 through the foreign matter suction unit 120, the impregnating material supply unit 130, the content injecting unit 140, the frame member supply unit 150, and the impregnating material fixing unit 160, so that the cosmetic vessel 200 is supplied for another process. Accordingly, the cosmetic vessel 200 is moved to a working place for an automatic process, a semi-automatic process or a manual process after being transferred along the transfer line 115.

The configuration of the cosmetic vessel output unit 170 will be described below in more detail. The cosmetic vessel output unit 170 includes a support post 171, a guide rail 172, a sliding member 173, and a vessel transferring unit 174. The vessel transferring unit 174 includes an actuator **174*a* and a clamp unit 174*b***.

The support post 171 is mounted in an upright state on the top surface of the transfer table 110, and the guide rail 172 has one end coupled to the support post 171 and an opposite end extending in a direction the same as a longitudinal direction of the transfer table 110.

In addition, the sliding member 173 is slidably coupled to the guide rail 172 along a longitudinal direction of the guide rail 721, and the vessel transferring unit 174 is coupled to a lower portion of the sliding member 173. In addition, the clamp unit 174*b* of the vessel transferring unit 174 is pressed inward or spread outward through the operation of the second actuator 174*a* to grasp the cosmetic vessel 200 or release the grasping state of the cosmetic vessel 200. Although the actuator 174*a* is a hydraulic cylinder according to the present embodiment, the disclosure is not limited thereto.

In other words, the cosmetic vessel output unit 170 transfers the cosmetic vessel 200 from the transfer table 110 to the transfer line 115 associated with another process as the sliding member 173 reciprocates along the guide rail 172 between the upper portion of the transfer table 110 and the transfer line 115 associated with another process while the clamp unit 174*b* of the vessel transferring unit 174 repeats the process of grasping the cosmetic vessel 200 or releasing the grasping state of the cosmetic vessel 200.

Hereinafter, a method for preparing cosmetics by impregnating contents into an impregnating material according to one embodiment of the disclosure will be described in detail with reference to accompanying drawings.

The method for preparing the cosmetics by impregnating the contents into the impregnating material according to one embodiment of the disclosure includes a foreign matter suction step (step S100) of sucking a foreign matter from the cosmetic vessel 200 after the cosmetic vessel 200 transferred along the transfer table 110 is stopped under the foreign matter suction unit 120 according to the disclosure, an impregnating material supply step (step S200) of supplying the impregnating material 210 into the cosmetic vessel 200 as the cosmetic vessel 200 from which the foreign matters are sucked is stopped under the impregnating material supply unit 130, a content injection step (step S300) of injecting contents by moving back the content injecting unit 140 after the content injection unit presses the impregnating material 210 as the cosmetic vessel is stopped under the content injecting unit 140, a frame member supply step (step S400) of supplying a frame member 220 to a mouth of the cosmetic vessel 200 as the impregnating material 210 having the contents injected therein is stopped under the frame member supply unit 150, and an impregnating material fixing step (step S500) of pressing the frame member 220 to fix the impregnating material 210 into a receiving space of the cosmetic vessel 200 as the cosmetic vessel 200 having the supplied frame member 220 is stopped under the impregnating material fixing unit 160.

In the foreign matter suction step (step S100), when the cosmetic vessel 200 transferred along the transfer table 110 is stopped under the foreign matter suction unit 120, the vertically moving unit 124 and the suction cover 125 coupled to the vertically moving unit 124 move down by the actuator 122 of the foreign matter suction unit 120. Then, the foreign matters are sucked from the receiving space of the cosmetic vessel 200 through the hydraulic hose 126.

In the impregnating material supply step (step S200), when the cosmetic vessel 200, from which the foreign matters is sucked from the receiving space thereof, is stopped under the impregnating material supply unit 130 as described above, the adsorption unit 135 of the impregnating material supply unit 130 adsorbs the impregnating material 210 stored at the outside of the transfer table 110, and the vertically moving unit 134 moves the impregnating material 210 onto the receiving space of the cosmetic vessel 200 according to the movement of the sliding coupling unit 132, and moves down by the actuator 133. Then, in this state, the adsorption force is removed from the adsorption unit 135, so that the impregnating material 210 is provided in the receiving space of the cosmetic vessel 200.

In the content injection step (step S300), when the cosmetic vessel 200 having the supplied impregnating material 210 is stopped under the content injecting unit 140, the pressing unit 146 moves down to press and contract the impregnating material 210. Thereafter, the pressing unit 146 gradually moves up while contents introduced through the nozzle 147 are injected through the injection ports 146*c* of the pressing unit 146.

In the frame member supply step (step S400), when the cosmetic vessel 200 provided therein with the impregnating material 210 impregnated with the contents is stopped under the frame member supply unit 150, the vertically moving unit 154 moves onto the receiving space of the cosmetic vessel 200 along the guide rail 151 of the frame member supply unit 150. In this case, the frame member 220 to be supplied is grasped by the clamp unit 158. Then, after the vertically moving unit 154 moves down by the first actuator 153, the clamp unit 158 is spread by the second actuator 157 while the frame member 220 grasped by the clamp unit 158 is placed at the mouth of the cosmetic vessel 200.

In the impregnating material fixing step (step S500), when the cosmetic vessel 200 having the supplied frame member 220 is stopped under the frame member fixing unit 160 as described above, the pressing member 164 moves down by the actuator 162 of the pressing to press the frame member 220, so that the circumference of the impregnating material 210 is pressed by the frame member 220 and the impregnating material is fixed into the receiving space of the cosmetic vessel 200.

The cosmetic vessel 200 of cosmetics, which are prepared by sequentially undergoing the foreign matter suction step (step S100), the impregnating material supply step (step S200), the content injection step (step S300), the frame member supply step (step S400), and the impregnating material fixing step (step S500), are transferred to the transfer line 115 associated with another process by the cosmetic vessel output unit 170.

Although a preferred embodiment of the disclosure has been described for illustrative purposes, those skilled in the art will appreciate that various modifications, additions and substitutions are possible, without departing from the scope and spirit of the disclosure as disclosed in the accompanying claims.

What is claimed is:

1. An apparatus for preparing cosmetics by impregnating contents into an impregnating material, the apparatus comprising:

a transfer table (110) to transfer a cosmetic vessel (200);

an impregnating material supply unit (130) to introduce an impregnating material (210) into a receiving space of the cosmetic vessel (200);

a content injecting unit (140) to inject the contents while moving back after pressing the impregnating material (210) introduced into the receiving space of the cosmetic vessel (200);

a frame member supply unit (150) to supply a frame member (220) for fixing the impregnating material (210) impregnated with the contents; and an impregnating material fixing unit (160) to mount the frame member (220) at a mouth of the cosmetic vessel (200) in a state that the frame member (220) presses and fixes a circumference of the impregnating material (210).

2. The apparatus of claim 1, further comprising a foreign matter suction unit (120) to suck a foreign matter from the receiving space of the cosmetic vessel (200).

3. The apparatus of claim 1, further comprising a cosmetic vessel output unit (170) to supply the cosmetic vessel (200) having the impregnating material (210) fixed in the receiving space of the cosmetic vessel (200) to a transfer line (115) of another process through the impregnating material supply unit (130), the content injecting unit (140), the frame member supply unit (150), and the impregnating material fixing unit (160).

4. The apparatus of claim 1, wherein the content injecting unit (140) comprises:

a press body (141) fixed to the transfer table (110);

an actuator (142) mounted in the press body (141) and including a vertically movable unit (142*a*);

a pressing unit (146) coupled to a lower end of the vertically movable unit (142*b*) and inserted into the receiving space of the cosmetic vessel (200) when the vertically movable unit (142*b*) moves down to press the impregnating material (210); and a nozzle (147) coupled to one side of the pressing unit (146) to introduce the contents when the pressing unit (146) moves up.

5. The apparatus of claim 4, wherein the pressing unit (146) comprises:

an inlet (146*a*) to receive the contents from the nozzle (147);

a movement space (146*b*) to move the contents received through the inlet (146*a*); and a plurality of injection ports (146*c*) to inject the contents to an upper portion of the impregnating material (210).

6. A method for preparing cosmetics by impregnating contents into an impregnating material, the method comprising:

supplying an impregnating material (210) to a cosmetic vessel (200) transferred along a transfer table (110) as the cosmetic vessel (200) is stopped under an impregnating material supply unit (130) (S200);

injecting contents by moving back a content injecting unit (140) after the content injecting unit (140) presses the impregnating material (210) as the cosmetic vessel (200) is stopped under the content injecting unit (140) (S300);

supplying a frame member (220) to a mouth of the cosmetic vessel (200) as the impregnating material (210) having the injected contents is stopped under a frame member supply unit (150) (S400); and fixing the impregnating material (210) in a receiving space of the cosmetic vessel (200) by pressing the frame member (220) as the cosmetic vessel (200) having the supplied frame member (220) is stopped under an impregnating material fixing unit (160) (S500).

7. The method of claim 6, further comprising sucking a foreign matter from the cosmetic vessel (200) as the cosmetic vessel (200) is stopped under a foreign matter suction unit (120) before the cosmetic vessel (200) is transferred to step (S200) of supplying the impregnating material (S100).

* * * * *